US011267488B2

(12) United States Patent
Namba et al.

(10) Patent No.: US 11,267,488 B2
(45) Date of Patent: Mar. 8, 2022

(54) AUTOMATIC DRIVING CONTROL APPARATUS FOR VEHICLE

(71) Applicant: SUBARU CORPORATION, Tokyo (JP)

(72) Inventors: Ryosuke Namba, Tokyo (JP); Hajime Oyama, Tokyo (JP); Masato Mizoguchi, Tokyo (JP); Keisuke Kuwahara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/933,442

(22) Filed: Jul. 20, 2020

(65) Prior Publication Data

US 2021/0078605 A1 Mar. 18, 2021

(30) Foreign Application Priority Data

Sep. 18, 2019 (JP) .............................. JP2019-169705

(51) Int. Cl.
*B60W 40/08* (2012.01)
*B60W 60/00* (2020.01)

(52) U.S. Cl.
CPC ........ *B60W 60/0051* (2020.02); *B60W 40/08* (2013.01); *B60W 2040/0809* (2013.01); *B60W 2540/30* (2013.01); *B60W 2556/10* (2020.02)

(58) Field of Classification Search
CPC ............. B60W 60/0051; B60W 40/08; B60W 2556/10; B60W 2040/0809; B60W 2540/30; B60W 40/09; B60W 2540/043
See application file for complete search history.

(56) References Cited

U.S. PATENT DOCUMENTS

| 10,549,779 | B2* | 2/2020 | Park | G06K 9/00288 |
| 10,921,804 | B2* | 2/2021 | Okimoto | B60W 50/08 |
| 2017/0364070 | A1 | 12/2017 | Oba | |
| 2020/0094809 | A1* | 3/2020 | Payne | B60W 20/10 |

FOREIGN PATENT DOCUMENTS

JP 2016-115356 A 6/2016

* cited by examiner

*Primary Examiner* — Peter D Nolan
*Assistant Examiner* — Ashley L Redhead, Jr.
(74) *Attorney, Agent, or Firm* — McDermott Will & Emery LLP (57) ABSTRACT

An automatic driving control apparatus for a vehicle can selectively switch between a manual driving mode in which a driver manually performs driving operation of the vehicle and an automatic driving mode in which driving operation is performed automatically along a target traveling route. The apparatus includes a driver identifier that identifies the driver, a driving experience value evaluation unit that evaluates a driving experience value based on a traveling history in the manual driving mode of the identified driver, a shift permission time setting unit that sets a shift permission time from the manual driving mode to the automatic driving mode based on the driving experience value, and a driving mode switching unit that controls the driving mode so as to be switchable to the automatic driving mode on condition that at least a driving time by the driver in the manual driving mode exceeds the shift permission time.

14 Claims, 8 Drawing Sheets

AUTOMATIC DRIVING CONTROL APPARATUS FOR VEHICLE

CROSS-REFERENCE TO RELATED APPLICATIONS

The present application claims priority from Japanese Patent Application No. 2019-169705 filed on Sep. 18, 2019, the entire contents of which are hereby incorporated by reference.

BACKGROUND

The technology relates to an automatic driving control apparatus for a vehicle capable of switching between a manual driving mode in which a driver performs driving operation and an automatic driving mode in which the driver needs not perform driving operation.

In recent years, automatic driving control apparatuses have been developed which allow vehicles such as automobiles to travel in an automatic driving mode in which drivers need not perform driving operation.

In such automatic driving control apparatuses, when it is determined during traveling in the automatic driving mode that the automatic driving mode cannot be continued due to a change in a traveling environment or a system defect or the like, traveling can be continued by switching the driving mode from the automatic driving mode to a manual driving mode or the like.

Therefore, for such automatic driving control apparatuses, it is important on the way to a destination to verify in advance whether the driver is ready to take over driving from the automatic driving mode. In contrast, for example, Japanese Unexamined Patent Application Publication No. 2016-115356 discloses a technique that determines, before starting automatic driving of a vehicle, an awakening degree as driving ability of a driver and prohibits the traveling in the automatic driving mode when a return determination unit determines that the driver lacks driving ability.

SUMMARY

An aspect of the technology provides an automatic driving control apparatus for a vehicle that can selectively switch a driving mode between a manual driving mode in which a driver manually performs driving operation of the vehicle and an automatic driving mode in which driving operation is performed automatically along a set target traveling route. The automatic driving control apparatus includes a driver identifier, a driving experience value evaluation unit, and a shift permission time setting unit. The driver identifier is configured to identifies the driver. The driving experience value evaluation unit is configured to evaluate a driving experience value of the driver for the vehicle based on a traveling history in the manual driving mode of the identified driver. The shift permission time setting unit is configured to set a shift permission time until a shift from the manual driving mode to the automatic driving mode is permitted based on the driving experience value. The driving mode switching unit is configured to control the driving mode so as to be switchable to the automatic driving mode on condition that at least a driving time by the driver in the manual driving mode exceeds the shift permission time.

An aspect of the technology provides an automatic driving control apparatus for a vehicle can selectively switch a driving mode between a manual driving mode in which a driver manually performs driving operation of the vehicle and an automatic driving mode in which driving operation is performed automatically along a set target traveling route. The automatic driving control apparatus includes circuitry. The circuitry is configured to identify a driver. The circuitry is configured to evaluate a driving experience value of the driver for the vehicle based on a traveling history in the manual driving mode of the identified driver. The circuitry is configured to set a shift permission time until a shift from the manual driving mode to the automatic driving mode is permitted based on the driving experience value. The circuitry is configured to control the driving mode so as to be switchable to the automatic driving mode on condition that at least a driving time by the driver in the manual driving mode exceeds the shift permission time.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

Even when an appropriate awakening degree is maintained, a vehicle steering characteristic and an acceleration/deceleration characteristic vary individually depending on types of vehicles, and so when a driver unfamiliar with the vehicle is in the vehicle, if the driving mode is shifted from an automatic driving mode to a manual driving mode, it may be difficult to appropriately take over the vehicle driving operation during traveling. Therefore, it may be preferable not to permit such a driver the automatic driving mode from the beginning to ensure safety.

It is desirable to provide an automatic driving control apparatus for a vehicle capable of accurately determining whether a driver who gets on a vehicle is permitted to drive in an automatic driving mode.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
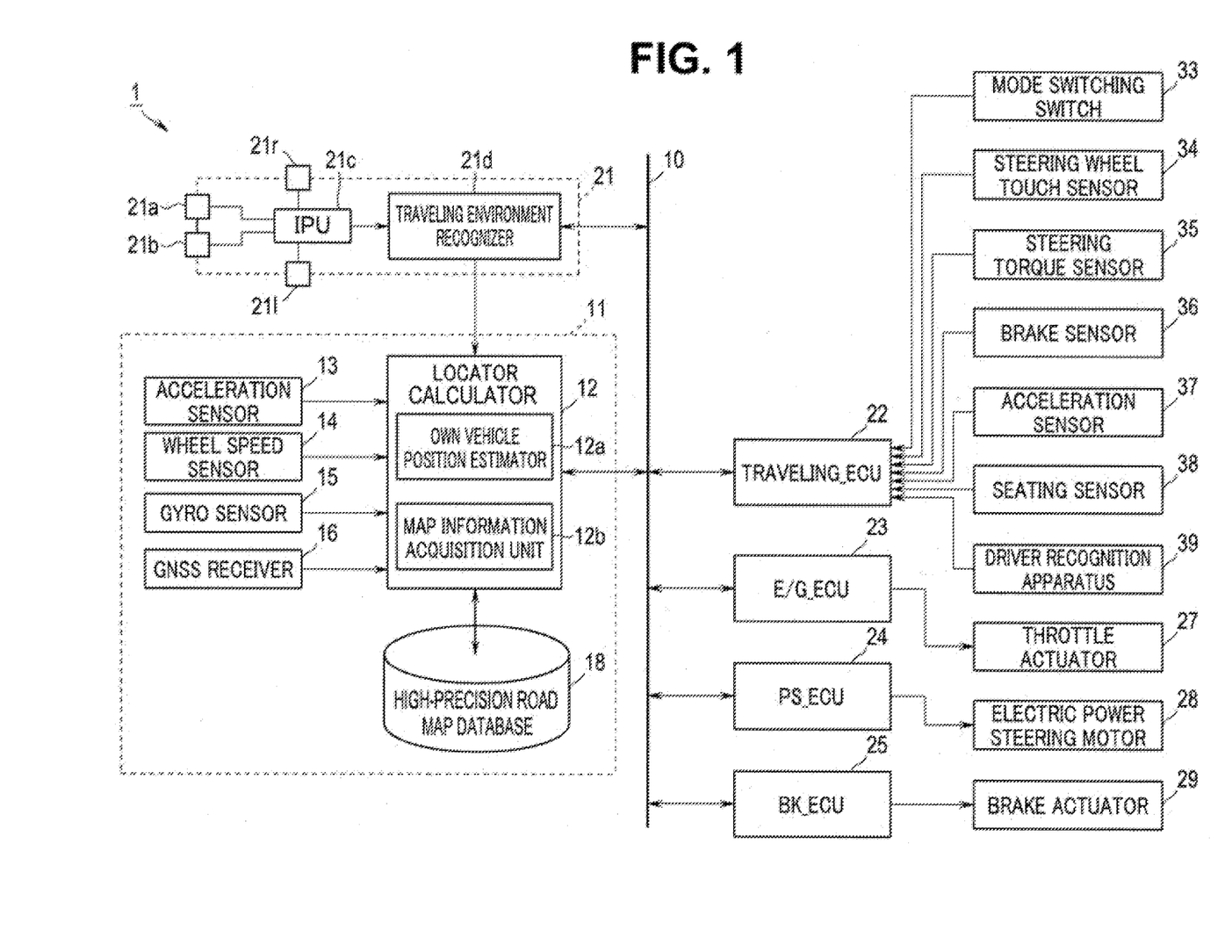
FIG. 1 is a schematic configuration diagram of an automatic driving control apparatus for a vehicle.

An automatic driving control apparatus 1 illustrated in FIG. 1 is mounted on a vehicle (own vehicle) such as an automobile. The automatic driving control apparatus 1 includes a locator unit 11 and a camera unit 21 as sensor units (traveling environment recognizer) to recognize a traveling environment outside a vehicle, and both units 11 and 21 constitute completely independent multiplex systems, which are independent of each other. The automatic driving control apparatus 1 also includes a traveling control unit (hereinafter referred to as "traveling_ECU") 22, an engine control unit (hereinafter referred to as "E/G_ECU") 23, a power steering control unit (hereinafter referred to as "PS_ECU") 24 and a brake control unit (hereinafter referred to as "BK_ECU") 25, and the respective control units 22 to 25 together with the locator unit 11 and the camera unit 21 are connected together via an in-vehicle communication channel 10 such as a CAN (Controller Area Network).

The locator unit 11 estimates a position of the own vehicle on a road map and includes a locator calculator 12 that estimates the position of the own vehicle. Sensors necessary to estimate the position of the own vehicle (own vehicle position) such as a longitudinal acceleration sensor 13 that detects longitudinal acceleration of the own vehicle, a wheel speed sensor 14 that detects rotating speeds of front left, front right, rear left and rear right wheels, a gyro sensor 15 that detects angular velocity or angular acceleration of the own vehicle, a GNSS receiver 16 that receives positioning signals emitted from a plurality of positioning satellites, or the like are coupled to an input side of the locator calculator 12.

A high-precision road map database 18 is coupled to the locator calculator 12 as a storage. The high-precision road map database 18 is a large volume storage medium such as an HDD and stores high-precision road map information (dynamic map). The high-precision road map information includes lane width data, lane center position coordinate data, traveling directional angle data of a lane, limit speed or the like as lane data necessary to perform automatic driving. The lane data is stored at intervals of several meters on each lane of the road map.

The locator calculator 12 is provided with an own vehicle position estimator 12a that estimates the position of the own vehicle and a map information acquisition unit 12b. The map information acquisition unit 12b acquires route map information from a current location to a destination from the map information stored in the high-precision road map database 18 based on the destination set by the driver, for example, for automatic driving.

The map information acquisition unit 12b transmits the acquired route map information (lane data on the route map) to the own vehicle position estimator 12a. The own vehicle position estimator 12a acquires position coordinates of the own vehicle based on the positioning signals received by the GNSS receiver 16. The own vehicle position estimator 12a map-matches the acquired position coordinates on the route map information, estimates the own vehicle position on the road map, identifies a traveling lane and acquires a road curvature at the center of the traveling lane stored in the road map data.

In an environment such as traveling through a tunnel where it is not possible to receive effective positioning signals from positioning satellites due to deterioration of sensitivity of the GNSS receiver 16, the own vehicle position estimator 12a switches to an autonomous navigation method that estimates the own vehicle position based on a vehicle speed calculated based on a wheel speed detected by the wheel speed sensor 14, an angular velocity detected by the gyro sensor 15 and longitudinal acceleration detected by the longitudinal acceleration sensor 13 to estimate the own vehicle position on the road map.

The camera unit 21 is fixed to the center of an upper part of the front in the vehicle room, and includes a vehicle-mounted camera (stereo camera) composed of a main camera 21a and a subcamera 21b disposed at symmetric positions across the center in a vehicle width direction, an image processing unit (IPU) 21c and a traveling environment recognizer 21d.

The IPU 21c applies predetermined image processing to forward traveling environment image information ahead of the own vehicle imaged by both cameras 21a and 21b, and generates forward traveling environment image information (distance image information) including distance information obtained from a displacement amount of the corresponding target.

The traveling environment recognizer 21d calculates a road curvature [1/m] of lane markers that mark the left and right of a travel path (own vehicle travel path) along which the own vehicle travels and a width (lane width) between the left and right lane markers based on the distance image information received from the IPU 21c. Various methods for calculating the road curvature and the lane width are known, and, for example, regarding the road curvature, the traveling environment recognizer 21d applies binarization processing using a brightness difference based on the forward traveling environment image information, recognizes the left and right lane markers, obtains curvatures of the left and right lane markers for every predetermined section using a curve approximation expression according to a least squares method or the like and further calculates the lane width from a curvature difference between the both lane markers.

The traveling environment recognizer 21d then calculates a road curvature at the center of the lane based on the curvatures of the left and right lane markers and the lane width, and further calculates a lateral position deviation of the own vehicle based on the center of the lane, or to be more exact, an own vehicle lateral position deviation Xdiff, which is a distance from the lane center to the center in the vehicle width direction of the own vehicle.

Furthermore, the traveling environment recognizer 21d applies predetermined pattern matching or the like to the distance image information to recognize guard rails, curbstone and solid bodies located along the road. Regarding the recognition of solid bodies here, the traveling environment recognizer 21d recognizes, for example, types of the solid bodies, distances to the solid bodies, speeds of the solid bodies and relative speeds between the solid bodies and the own vehicle.

Furthermore, the camera unit 21 includes side rear cameras 21l and 21r for imaging left/right rear sides of the own vehicle. When the IPU 21c receives the traveling environment image information on the sides of the own vehicle imaged by the side rear cameras 21l and 21r, the IPU 21c performs predetermined image processing such as edge detection. Furthermore, the traveling environment recognizer 21d performs predetermined pattern matching or the like on the edge information detected by the IPU 21c to recognize the solid bodies such as parallel traveling vehicles located on the side of the own vehicle and following vehicles located behind.

The own vehicle position estimated by the own vehicle position estimator 12a of the locator calculator 12, the own vehicle lateral position deviation Xdiff and the solid body information obtained by the traveling environment recognizer 21d of the camera unit 21 or the like are read by the traveling_ECU 22. Furthermore, a mode switching switch 33 for the driver to turn ON/OFF automatic driving (driving assist control), a steering wheel touch sensor 34 to be turned ON when the driver holds the steering wheel (steering holding), a steering torque sensor 35 to detect steering torque as a driving operation amount by the driver, a brake sensor 36 to detect a depression amount of the brake pedal as an amount of driving operation by the driver, an acceleration sensor 37 to detect a depression amount of the acceleration pedal as an amount of driving operation by the driver, a seating sensor 38 as a driver identifier to detect a state in which the driver is sitting on the driver seat and a driver recognition apparatus 39 as a driver identifier to recognize information on the driver seated on the driver seat are coupled to the input side of the traveling_ECU 22 as various switches and sensors.

Here, the driver recognition apparatus 39 includes, for example, a camera that picks up an image of the driver seated on the driver seat, processes the picked-up image, performs authentication of the face or the like to recognize the driver, and can thereby monitor the awakening degree or looking-aside of the driver based on recognized changes in driver's facial expression and face orientation. Note that the driver recognition apparatus 39 may be configured to recognize the driver by comparing a face photo registered in an IC driver license with an image picked up by the camera.

A manual driving mode, a first driving assist mode, a second driving assist mode and an evacuation mode are set in the traveling_ECU 22 as driving modes.

Here, the manual driving mode is a driving mode in which steering holding by the driver 100 is necessary, and is a driving mode in which the own vehicle is driven according to driving operation by the driver 100 such as steering operation, acceleration operation and brake operation.

Similarly, the first driving assist mode is also a driving mode in which steering holding by the driver 100 is necessary. That is, the first driving assist mode is a so-called semi-automatic driving mode in which driving operation by the driver 100 is reflected, adaptive cruise control, lane keep assist control and lane departure prevention control are mainly performed in combination under control of, for example, the E/G_ECU 23, the PS_ECU 24 and the BK_ECU 25, and the own vehicle is thereby caused to travel along a target traveling route.

The second driving assist mode is an automatic driving mode in which without requiring steering holding, acceleration operation or brake operation by the driver 100, the adaptive cruise control, the active lane keep control and the lane departure prevention control are mainly performed in combination under control of, for example, the E/G_ECU 23, the PS_ECU 24 and the BK_ECU 25, and the own vehicle is thereby caused to travel along a target traveling route.

The evacuation mode is a mode in which the own vehicle is caused to stop automatically on a roadside or the like when, for example, during traveling in the second driving assist mode, traveling in the second driving assist mode cannot continue and the driver cannot take over the driving operation (that is, in the case of failure in a shift to the manual driving mode or the first driving assist mode).

Each driving mode set in this way can be selectively switched by the traveling_ECU 22 based on the operation situation or the like with respect to the mode switching switch 33.

A throttle actuator 27 is coupled to the output side of the E/G_ECU 23. The throttle actuator 27 is configured to open/close a throttle valve of an electronic control throttle provided for a throttle body of the engine, open/close the throttle valve according to a drive signal from the E/G_ECU 23 and adjust an intake air flow to thereby generate desired engine output.

An electric power steering motor 28 is coupled to the output side of the PS_ECU 24. The electric power steering motor 28 applies steering torque to a steering mechanism with the torque of the motor. In automatic driving, the electric power steering motor 28 is caused to perform control operation by a drive signal from the PS_ECU 24, and active lane keep control to keep traveling on the current traveling lane and lane change control for moving the own vehicle to a neighboring lane (lane change control for overtaking control or the like) are thereby executed.

A brake actuator 29 is coupled to the output side of the BK_ECU 25. The brake actuator 29 adjusts a brake hydraulic pressure supplied to a brake wheel cylinder provided for each wheel. When the brake actuator 29 is driven by a drive signal from the BK_ECU 25, a brake force on each wheel is generated by the brake wheel cylinder to forcibly decelerate.

In the automatic driving control apparatus 1, even if, for example, a change in the traveling environment or a system defect occurs on the way to the destination, causing the driving mode to shift from the automatic driving mode (second driving assist mode) to the manual driving mode, it is particularly important from the standpoint of safety that the driver be enabled to perform appropriate driving operation on the own vehicle during traveling.

For this reason, the traveling_ECU 22 of the automatic driving control apparatus 1 of the present embodiment evaluates the driver's aptitude in advance through monitoring of the driver during traveling in the manual driving mode and permits switching to the automatic driving mode only when the traveling_ECU 22 determines that the driver has the aptitude.

For example, the traveling_ECU 22 monitors the driving operation by the driver during traveling in the manual driving mode based on vehicle behavior or the like over a predetermined range and evaluates the driver's driving skill.

In consideration of the fact that a steering characteristic or acceleration/deceleration characteristic or the like differs from one vehicle (vehicle type) to another, when a driver unfamiliar with the vehicle gets on the vehicle, the traveling_ECU 22 monitors the driver during traveling in the manual driving mode and evaluates a driving experience value (degree of familiarity) to the vehicle in order to allow the driver to build a driving experience prior to a shift to the automatic driving mode.

When the driver's driving experience is evaluated to be at least a predetermined level or higher, the traveling_ECU 22 permits switching of the driving mode to the automatic driving mode. In one embodiment, the traveling_ECU 22 may serve as a "driving experience value evaluation unit", a "shift permission time setting unit", and a "driving mode switching unit".

Next, start control performed by the traveling_ECU 22 in the automatic driving mode (second driving assist mode) will be described according to a start control routine in the automatic driving mode illustrated in FIG. 2.

The routine is repeatedly executed every set time, and when the routine starts, the traveling_ECU 22 first examines, in step S101, whether the manual driving mode is currently in progress.

When it is determined that the driving mode currently in progress is the manual driving mode, the traveling_ECU 22 proceeds to step S102 or when it is determined that the driving mode currently in progress is other than the manual driving mode (that is, the semi-automatic driving mode (first driving assist mode), or automatic driving mode (second driving assist mode) or evacuation mode), the traveling_ECU 22 proceeds to step S104.

Figure 2:
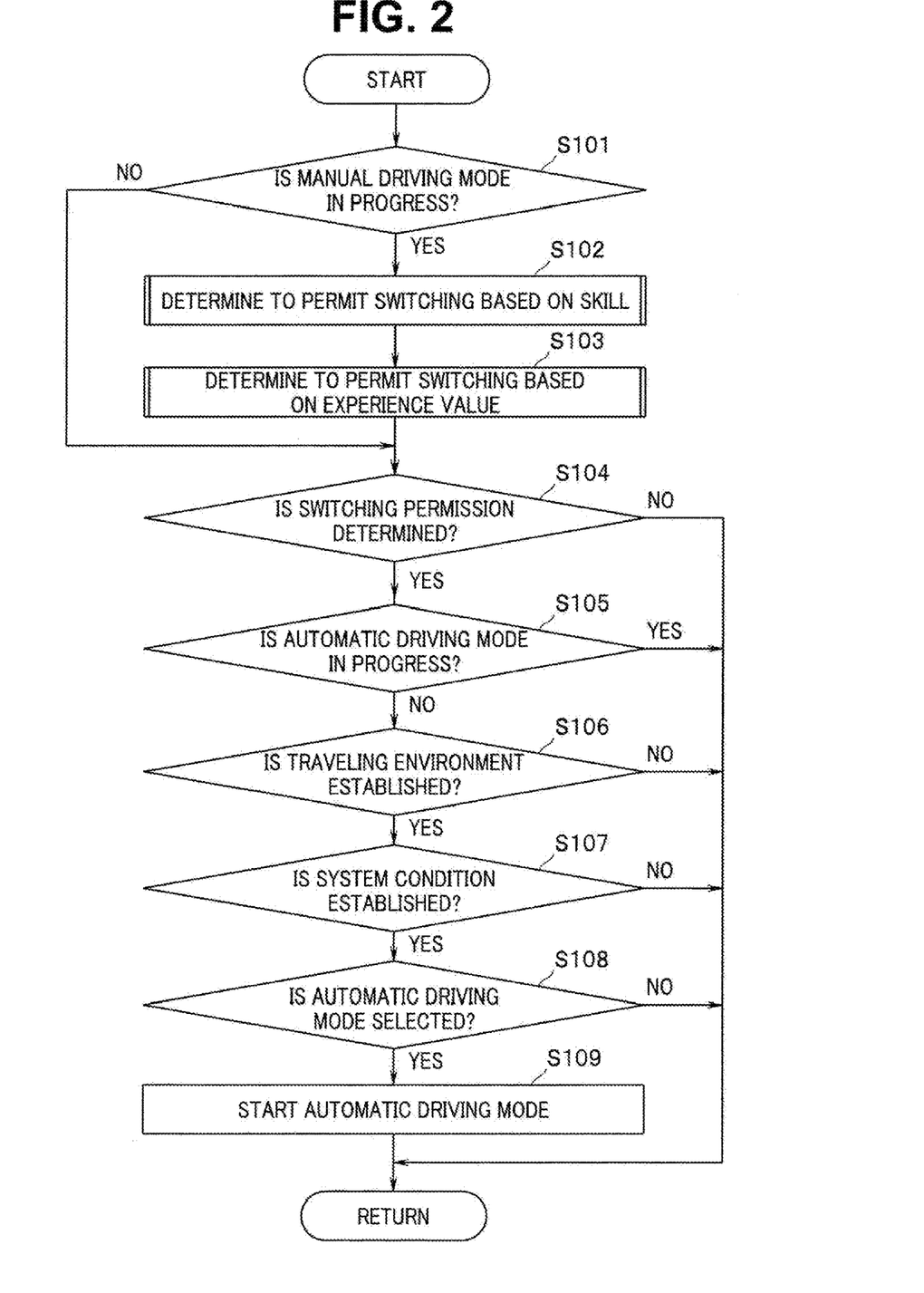
FIG. 2 is a flowchart illustrating a start control routine of an automatic driving mode.
Figure 3:
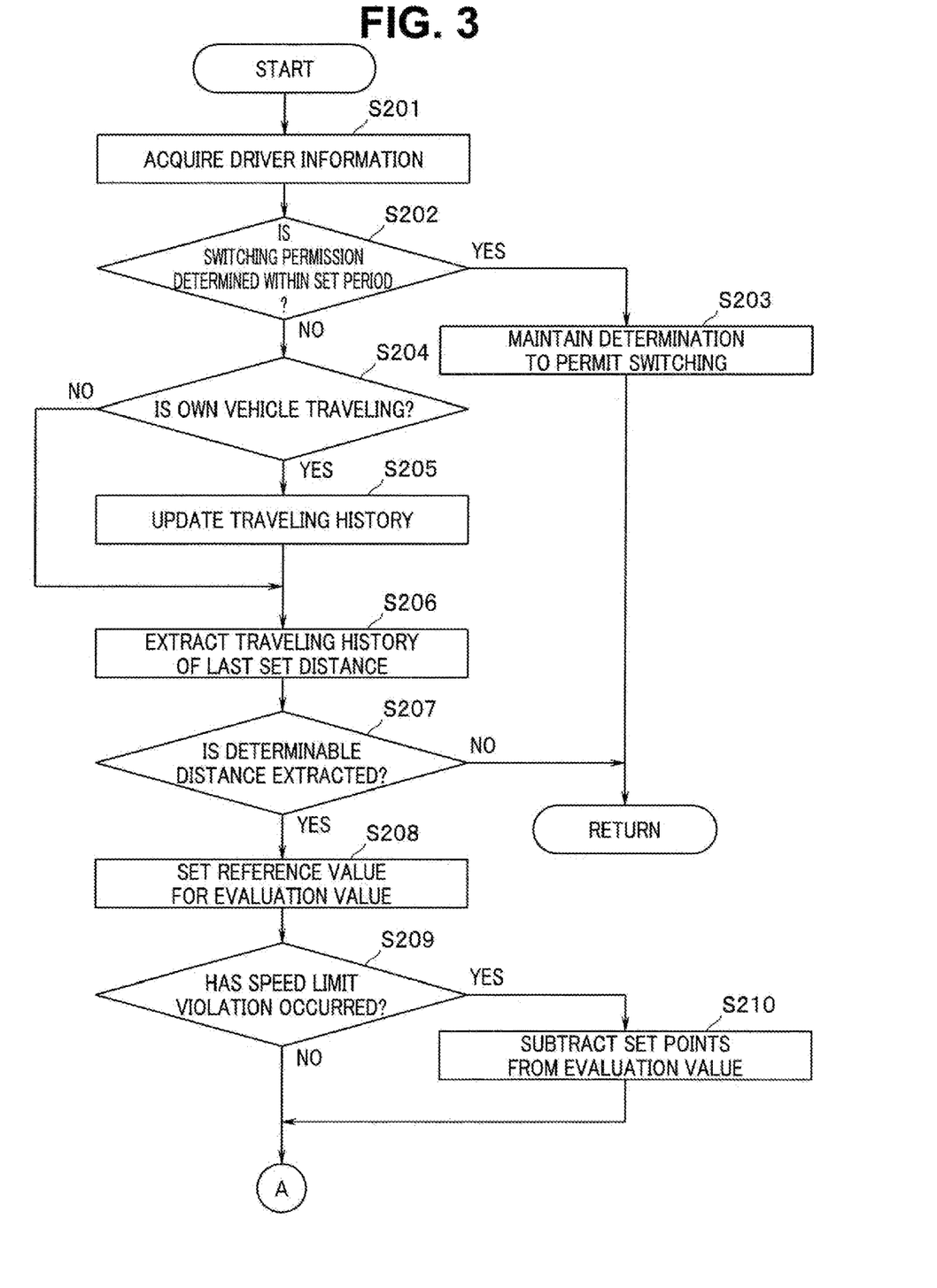
FIG. 3 is a flowchart (No. 1) illustrating a subroutine of determination to permit switching to an automatic driving control mode based on a driver's ability.
Figure 4:
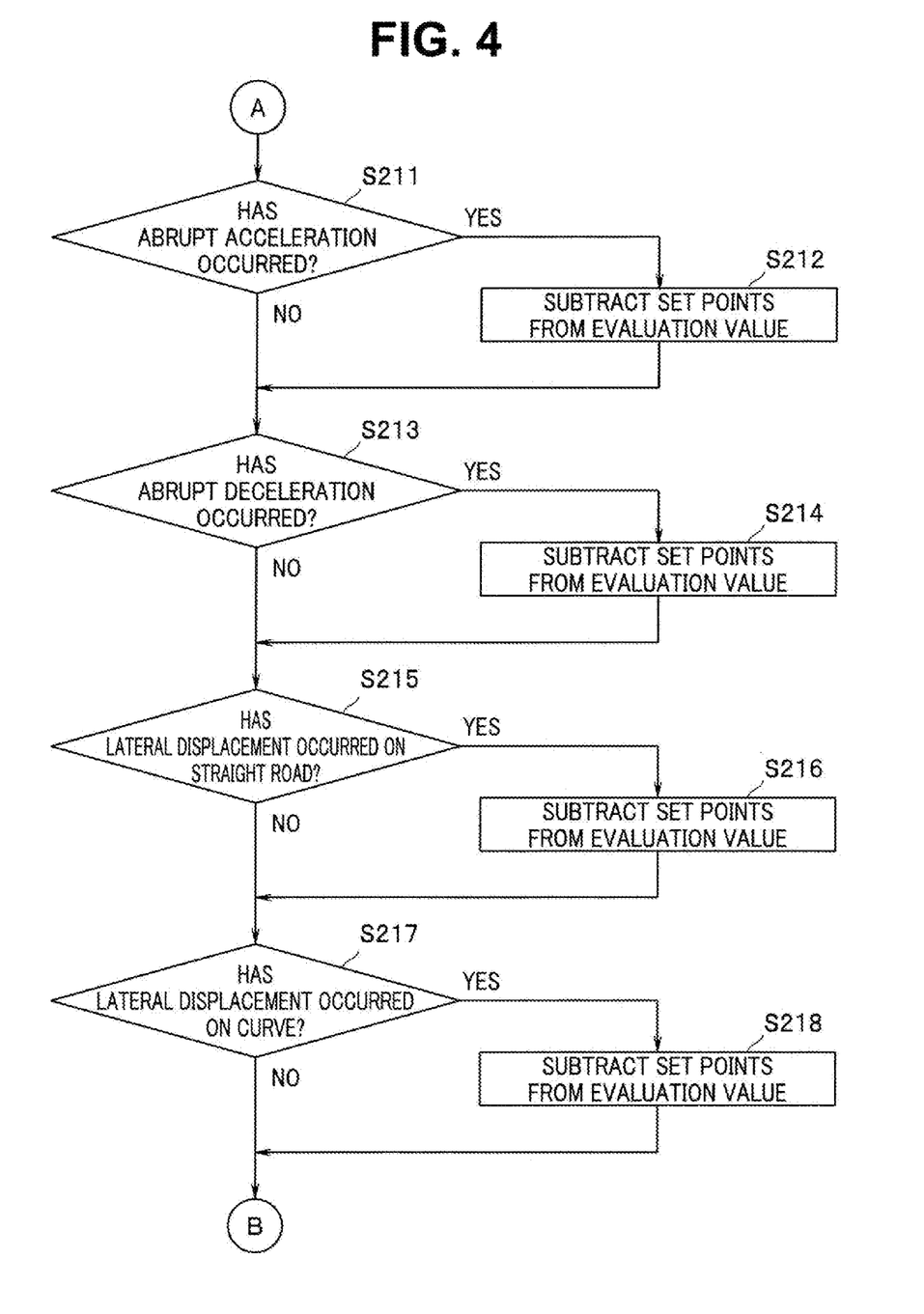
FIG. 4 is a flowchart (No. 2) illustrating the subroutine of determination to permit switching to the automatic driving control mode based on the driver's ability.
Figure 5:
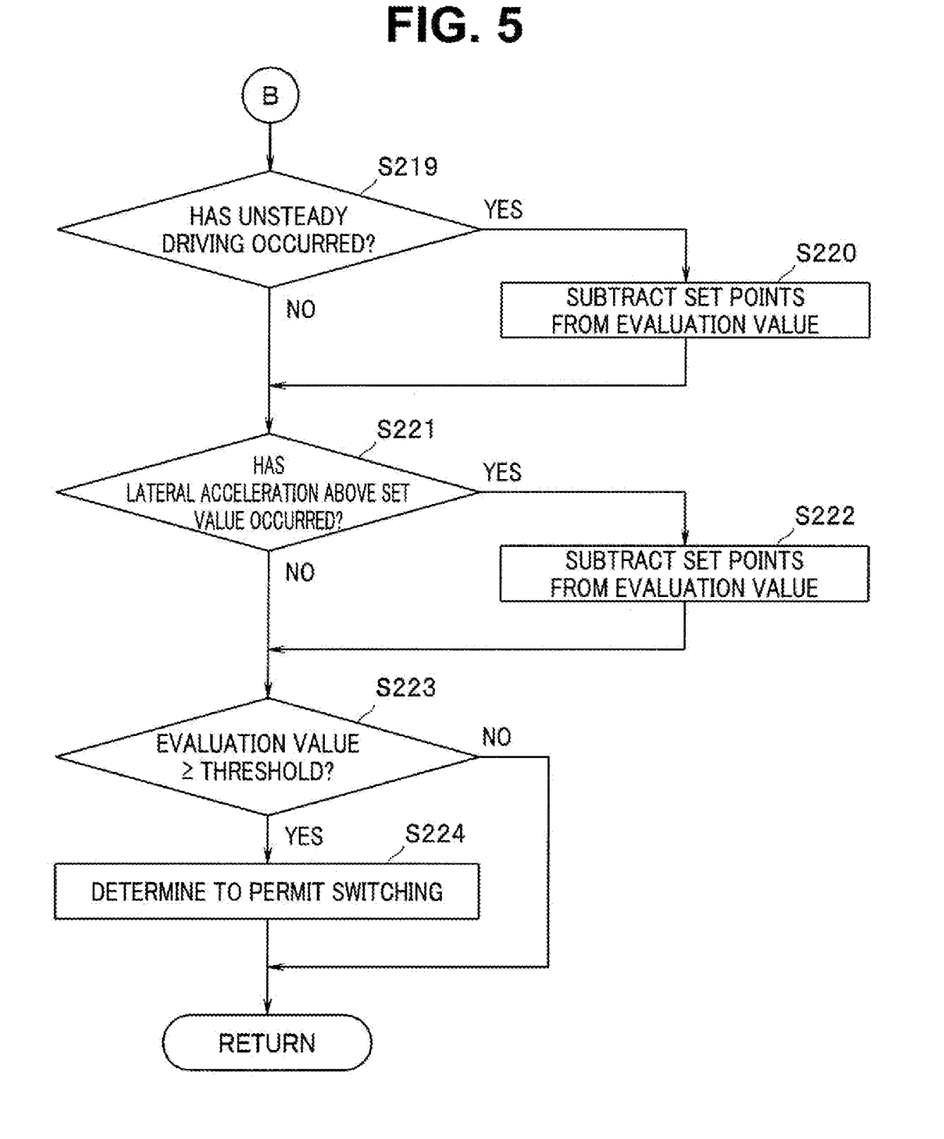
FIG. 5 is a flowchart (No. 3) illustrating the subroutine of determination to permit switching to the automatic driving control mode based on the driver's ability.

After proceeding from step S101 to step S102, the traveling_ECU 22 determines whether to permit switching to the automatic driving mode based on the driver's driving skill in the manual driving mode according to a subroutine illustrated, for example, in FIG. 3 to FIG. 5.

In this determination, the driving operation of the driver currently in the vehicle is monitored during traveling in the manual driving mode, the driver's driving skill is evaluated and whether to permit switching to the automatic driving mode is determined. For example, in this determination, the driver's driving operation is monitored based on the behavior or the like of the own vehicle for the last predetermined section in a traveling history when the driver currently in the vehicle is caused to drive the own vehicle in the manual driving mode and the driver's driving skill is thereby evaluated.

When the subroutine starts, in step S201, the traveling_ECU 22 acquires information on the driver currently seated on the driver seat based on information from the driver recognition apparatus 39.

In next step S202, the traveling_ECU 22 examines whether a determination to permit switching to the automatic driving mode has been made based on the driver's driving skill among drivers recognized in step S201 for a past set period (for example, within one month).

When it is determined in step S202 that a determination to permit switching to the automatic driving mode within the set period has been made, the traveling_ECU 22 proceeds to step S203 and exits the subroutine while maintaining the determination to permit switching to the automatic driving mode.

On the other hand, when it is determined in step S202 that no determination to permit switching to the automatic driving mode within the set period has been made, the traveling_ECU 22 proceeds to step S204 and examines whether the own vehicle is currently traveling.

When it is determined in step S204 that the own vehicle is currently traveling, the traveling_ECU 22 proceeds to step S205, updates information relating to the traveling history, and then proceeds to step S206. Here, the information relating to the traveling history is, for example, accumulated cumulatively in a storage medium or the like of the traveling_ECU 22. The information relating to the traveling history is acquired for each driver and includes various kinds of information, for example, road information on which the own vehicle has traveled (road width, curve curvature, limit speed or the like), own vehicle speed, acceleration/deceleration speed, the own vehicle lateral position deviation with respect to the lane center, presence or absence of unsteady driving, lateral acceleration, driving date and time, traveling place and traveling distance.

On the other hand, when it is determined in step S204 that the own vehicle is currently stopped, the traveling_ECU 22 jumps to step S206.

After proceeding from step S204 or step S205 to step S206, the traveling_ECU 22 extracts a traveling history with the latest set distance (for example, on the order of several Km to 10 Km) from among accumulated traveling histories about the driver. Note that the traveling_ECU 22 may extract a traveling history with the latest set time instead of the set distance.

In next step S207, the traveling_ECU 22 examines whether the traveling distance of the extracted traveling history is a distance enough to determine the skill of the driver (that is, whether a traveling history corresponding to the set distance has been obtained).

When it is determined in step S207 that the traveling distance of the extracted traveling history is not enough, the traveling_ECU 22 exits the subroutine as is.

On the other hand, when it is determined in step S207 that the traveling distance of the extracted traveling history is enough, the traveling_ECU 22 proceeds to step S208 and sets a reference value for evaluation values to evaluate the driver's driving skill in processes up to step S223 below.

In next step S209, the traveling_ECU 22 examines whether a speed limit violation has occurred based on the extracted traveling history. For example, when a vehicle has traveled 500 m or more at a speed exceeding the speed limit, by 20 Km/h or more, the traveling_ECU 22 determines that a speed limit violation has occurred.

When it is determined in step S209 that a speed limit violation has occurred, the traveling_ECU 22 proceeds to step S210, subtracts points set in advance for the speed limit violation from the evaluation value and then proceeds to step S211. Note that the points are set in such a way that the greater the number of speed limit violations, the greater the subtraction amount becomes.

On the other hand, when it is determined in step S209 that no speed limit violation has occurred, the traveling_ECU 22 proceeds to step S211 as is.

After proceeding from step S209 or step S210 to step S211, the traveling_ECU 22 examines whether abrupt acceleration has occurred based on the extracted traveling history. For example, when, for example, an acceleration of 0.4 G or more has occurred in the own vehicle, the traveling_ECU 22 determines that an abrupt acceleration has occurred. Note that this threshold of acceleration can also be set as a variable value based on, for example, a limit speed and a road curvature of the traveling path of the own vehicle.

When it is determined in step S211 that an abrupt acceleration has occurred, the traveling_ECU 22 proceeds to step S212, subtracts points set in advance for the occurrence of abrupt acceleration from the evaluation value and then proceeds to step S213. Note that the points are set in such a way that the greater the number of times abrupt acceleration has occurred, the greater the subtraction amount becomes.

On the other hand, when it is determined in step S211 that no abrupt acceleration has occurred, the traveling_ECU 22 proceeds to step S213 as is.

After proceeding from step S211 or step S212 to step S213, the traveling_ECU 22 examines whether an abrupt deceleration has occurred based on the extracted traveling history. For example, when a deceleration of 0.3 G or more has occurred in the own vehicle, the traveling_ECU 22 determines that an abrupt deceleration has occurred. Note that this threshold of deceleration can also be set as a variable value based on, for example, a limit speed and a road curvature of the traveling path of the own vehicle.

When it is determined in step S213 that an abrupt deceleration has occurred, the traveling_ECU 22 proceeds to step S214, subtracts points set in advance for the occurrence of abrupt deceleration from the evaluation value and then proceeds to step S215. Note that the points are set in such a way that the greater the number of times abrupt deceleration has occurred, the greater the subtraction amount becomes.

On the other hand, when it is determined in step S213 that no abrupt deceleration has occurred, the traveling_ECU 22 proceeds to step S215 as is.

After proceeding from step S213 or step S214 to step S215, the traveling_ECU 22 examines whether a lateral displacement has occurred on a straight road based on the extracted traveling history. For example, the traveling_ECU 22 regards a road having, for example, a road radius R>1000 as a straight road and determines that a lateral displacement has occurred when the own vehicle has traveled 100 m or more in a state in which with respect to a road (own vehicle travel path) having a road width of W, the vehicle is apart by (¼ W) or more from the center of the road.

When it is determined in step S215 that a lateral displacement has occurred on a straight road, the traveling_ECU 22 proceeds to step S216, subtracts points set in advance for the occurrence of a lateral displacement on the straight road from the evaluation value, and then proceeds to step S217. Note that the points are set in such a way that the greater the number of times a lateral displacement has occurred, the greater the subtraction amount becomes.

On the other hand, when it is determined in step S215 that no lateral displacement has occurred on the straight road, the traveling_ECU 22 proceeds to step S217 as is.

After proceeding from step S215 or step S216 to step S217, the traveling_ECU 22 examines whether a lateral displacement has occurred on a curve based on the extracted traveling history. For example, the traveling_ECU 22 regards a road having, for example, a road radius R≤1000 as a curve and determines that a lateral displacement has occurred when the own vehicle has traveled 10 m or more in a state in which with respect to a road (own vehicle traveling path) having a road width of W, the vehicle is apart by (¼ W) or more from the center of the road.

When it is determined in step S217 that a lateral displacement has occurred on a curve, the traveling_ECU 22 proceeds to step S218, subtracts points set in advance for the occurrence of a lateral displacement on the curve from the evaluation value, and then proceeds to step S219. Note that the points are set in such a way that the greater the number of times a lateral displacement has occurred, the greater the subtraction amount becomes.

On the other hand, when it is determined in step S217 that no lateral displacement has occurred on the curve, the traveling_ECU 22 proceeds to step S219 as is.

After proceeding from step S217 or step S218 to step S219, the traveling_ECU 22 examines whether unsteady driving of the own vehicle has occurred based on the extracted traveling history. For example, the traveling_ECU 22 determines that unsteady driving has occurred based on, for example, an image picked up by the camera unit 21 when the own vehicle runs over the lane line (lane marker) of the own vehicle traveling path three or more times during traveling a set distance.

When it is determined in step S219 that unsteady driving has occurred, the traveling_ECU 22 proceeds to step S220, subtracts points set in advance for the occurrence of unsteady driving from the evaluation value and then proceeds to step S221. Note that the points are set in such a way that the greater the number of times unsteady driving has occurred, the greater the subtraction amount becomes.

On the other hand, when it is determined in step S219 that no unsteady driving has occurred, the traveling_ECU 22 proceeds to step S221 as is.

After proceeding from step S219 or step S220 to step S221, the traveling_ECU 22 examines whether a lateral acceleration above a set value has occurred in the own vehicle based on the extracted traveling history. For example, when, for example, a lateral acceleration of 0.1 G or more has occurred in the own vehicle, the traveling_ECU 22 determines that a lateral acceleration above a set value has occurred. Note that this threshold of lateral acceleration may also be set as a variable value based on, for example, a limit speed and a road curvature of the traveling path of the own vehicle.

When it is determined in step S221 that a lateral acceleration above a set value has occurred, the traveling_ECU 22 proceeds to step S222, subtracts points set in advance for the occurrence of lateral acceleration from the evaluation value and then proceeds to step S223. Note that the points are set in such a way that the greater the number of times a lateral acceleration above a set value has occurred, the greater the subtraction amount becomes.

On the other hand, when it is determined in step S221 that no lateral acceleration above a set value has occurred, the traveling_ECU 22 proceeds to step S223 as is.

After proceeding from step S221 or step S222 to step S223, the traveling_ECU 22 examines whether the evaluation value calculated by the processes in step S208 to step S222 is equal to or higher than a threshold set in advance.

When it is determined in step S223 that the evaluation value is equal to or higher than the threshold, the traveling_ECU 22 proceeds to step S223, determines to permit switching to the automatic driving mode based on an evaluation of the driver's driving skill and then exits the subroutine.

On the other hand, when it is determined in step S223 that the evaluation value is less than the threshold, the traveling_ECU 22 exits the subroutine as is.

Figure 6:
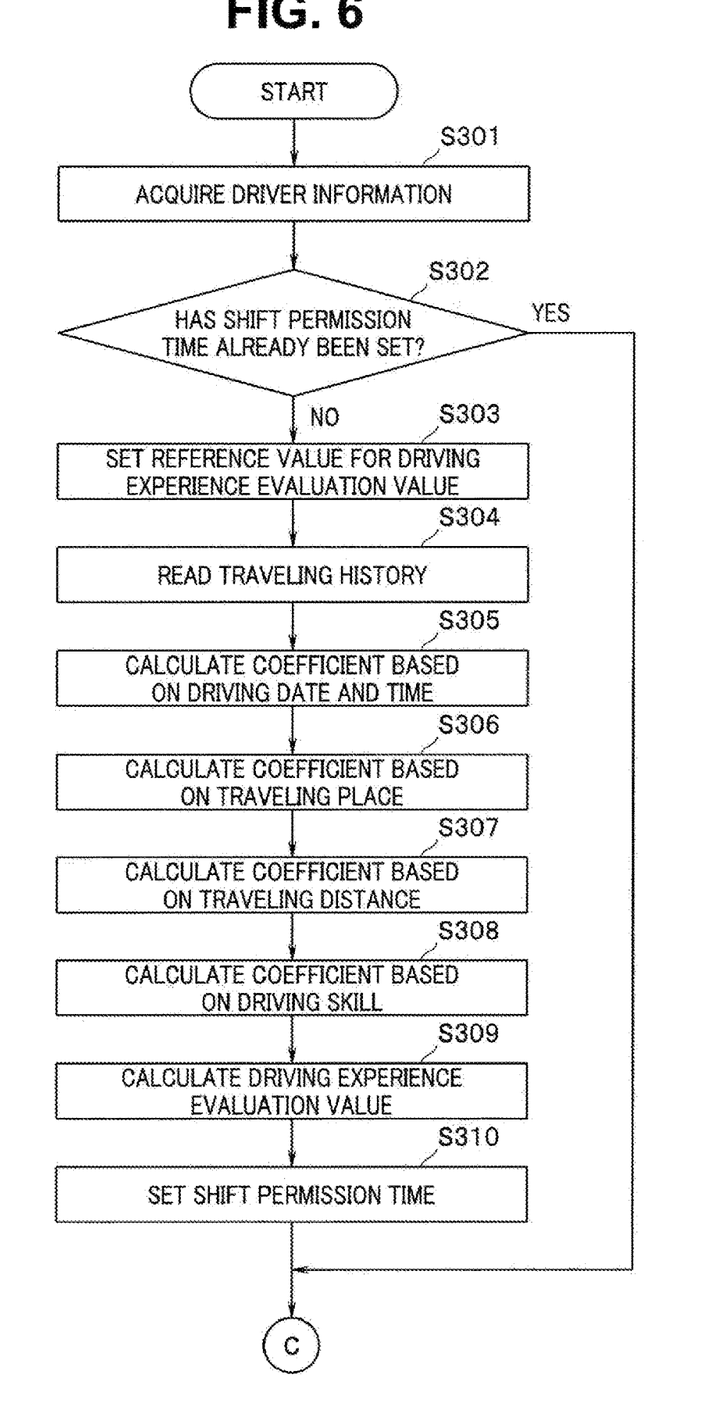
FIG. 6 is a flowchart (No. 1) illustrating a subroutine of determination to permit switching to the automatic driving control mode based on an experience value for the own vehicle of the driver.
Figure 7:
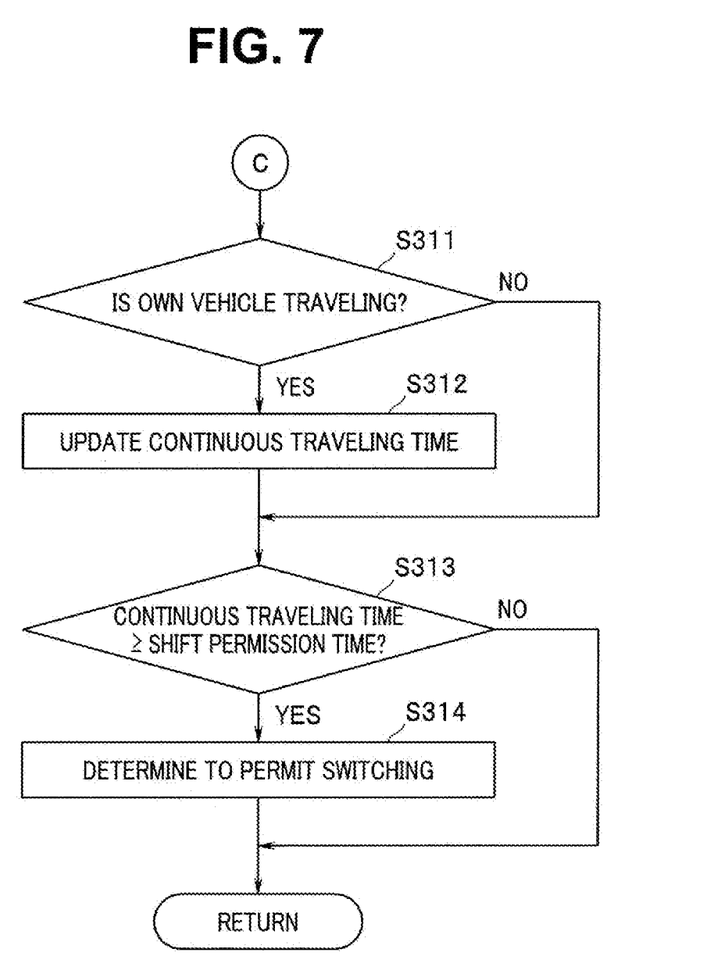
FIG. 7 is a flowchart (No. 2) illustrating the subroutine of determination to permit switching to the automatic driving control mode based on the experience value for the own vehicle of the driver.

In the main routine in FIG. 2, after proceeding from step S102 to step S103, the traveling_ECU22 determines whether to permit switching to the automatic driving mode based on the driver's experience value in the manual driving mode according to, for example, a subroutine illustrated in FIGS. 6 and 7.

This determination is intended to evaluate a driving experience value of the driver by monitoring the driving operation in the manual driving mode of the driver who is currently in the vehicle and determine whether to permit switching to the automatic driving mode. For example, this determination evaluates whether the driver has built sufficient driving experiences for the own vehicle based on the traveling history when the driver who is currently in the vehicle has driven the own vehicle in the manual driving mode and when it is evaluated that the driver lacks driving experience for the own vehicle, the driver is caused to build driving experiences in the manual driving mode for a predetermined time before being permitted to make switching to the automatic driving mode.

When the subroutine starts, the traveling_ECU 22 acquires information on the driver currently seated on the driver seat based on information from the driver recognition apparatus 39 in step S301.

In next step S302, the traveling_ECU 22 examines whether a shift permission time, which will be described later, has already been set after an ignition key of the own vehicle is turned ON. Here, the "shift permission time" is a time period during which the driver is allowed to build experiences with manual driving for the own vehicle prior to a shift to the automatic driving mode and is a traveling time in the manual driving mode required for the driver by the time a shift to the automatic driving mode is permitted.

When it is determined in step S302 that the shift permission time has already been set, the traveling_ECU 22 proceeds to step S311.

On the other hand, when it is determined in step S302 that the shift permission time has not been set yet, the traveling_ECU 22 proceeds to step S303 and sets a reference value for the driving experience evaluation value to evaluate the driver's familiarity with the own vehicle.

After proceeding from step S303 to step S304, the traveling_ECU 22 reads the driver's traveling history recognized in step S301 from among driving histories (that is, the driving histories updated in step S205 described above) accumulated cumulatively for each driver, for example, in the storage medium of the traveling_ECU 22.

After proceeding from step S304 to step S305, the traveling_ECU 22 examines the date and time at which the driver has driven the own vehicle by manual driving last time from the traveling history read in step S304. The traveling_ECU 22 calculates a coefficient k1 by which the reference value for the driving experience evaluation value is multiplied based on the date and time at which the driver has driven the vehicle last time. The coefficient k1 is set to a greater value, for example, as the date and time of the actual driving becomes closer to the date and time of the last drive (that is, the blank period in which the own vehicle is not driven becomes shorter).

After proceeding from step S305 to step S306, the traveling_ECU 22 examines a history of traveling places where the driver has driven the own vehicle by manual driving from the traveling history read in step S304. The traveling_ECU 22 calculates a coefficient k2 by which the reference value for the driving experience evaluation value is multiplied based on the history of traveling places. The coefficient k2 is set to a greater value, for example, as the number of times the vehicle traveled the same traveling places in the past increases. Alternatively, the coefficient k2 can also be set to a greater value, for example, as the number of times the driver traveled along the route to the destination currently set in the map information acquisition unit 12b increases.

After proceeding from step S306 to step S307, the traveling_ECU 22 examines a total traveling distance that the driver has driven the own vehicle by manual driving from the traveling history read in step S304. The traveling_ECU 22 calculates a coefficient k3 by which the reference value for the driving experience evaluation value is multiplied based on the total traveling distance. The coefficient k3 is set to be greater, for example, as the total traveling distance the driver has driven the own vehicle increases.

After proceeding from step S307 to step S308, the traveling_ECU 22 examines information relating to the skill when the driver has driven the own vehicle by manual driving from the traveling history read in step S304. The traveling_ECU 22 calculates a coefficient k4 by which the reference value for the driving experience evaluation value is multiplied based on the information relating to the skill. Here, as the information relating to the skill, for example, the number of times the own vehicle has exceeded a lateral displacement threshold from the lane center set from the own vehicle speed during traveling and the road shape (road width, curvature or the like) and the number of times the own vehicle has exceeded a unsteady driving threshold set from the own vehicle speed during traveling and the road shape (road width, curvature or the like) are extracted. The driver can be estimated to be more unfamiliar with the own vehicle as the number of these times increases. Therefore, the coefficient k4 is set to a smaller value as the number of times the own vehicle has exceeded the lateral displacement threshold or the number of times the own vehicle has exceeded the unsteady driving threshold increases.

After proceeding from step S308 to step S309, the traveling_ECU 22 calculates a driving experience evaluation value by multiplying the reference value for the driving experience evaluation value by the coefficients k1 to k4.

Figure 8:
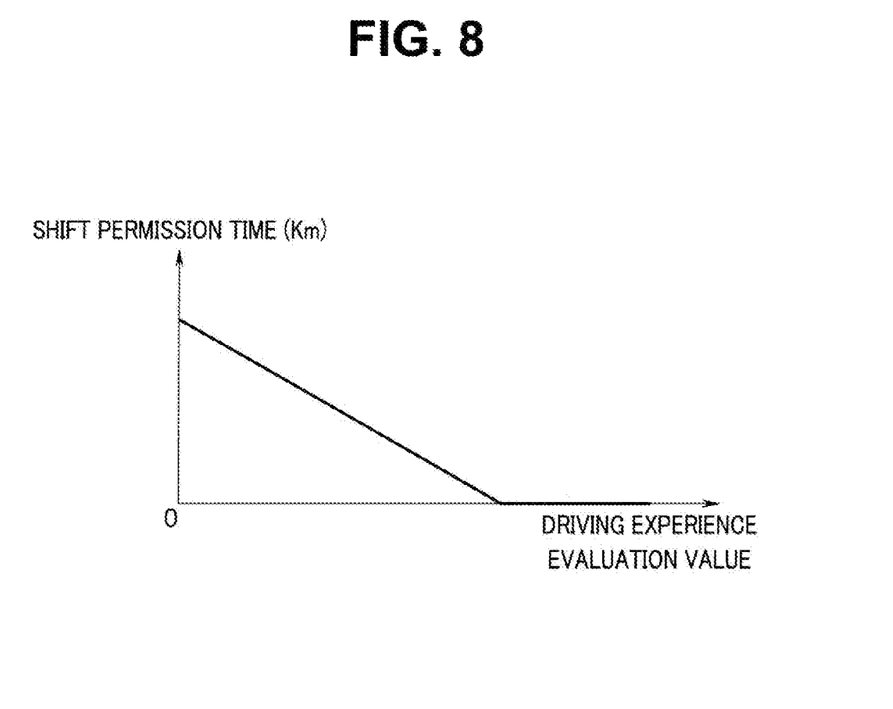
FIG. 8 is a map illustrating a relationship between a driving experience evaluation value and a shift permission time.

After proceeding from step S309 to step S310, the traveling_ECU 22 sets a shift permission time, which is a time that causes the driver to experience traveling by manual driving before permitting a shift to the automatic driving mode from the calculated driving experience evaluation value. The shift permission time is set with reference to, for example, a map illustrated in FIG. 8, and the shift permission time is set to be shorter as the driving experience evaluation value increases. Here, as is also apparent from FIG. 8, the shift permission time may be set to "0" for drivers whose driving experience evaluation value is high, for example, drivers who drive their own vehicles every day and who are familiar with the own vehicles.

After proceeding from step S302 or step S310 to step S311, the traveling_ECU 22 examines whether the own vehicle is currently traveling.

When it is determined in step S311 that the own vehicle is currently traveling, the traveling_ECU 22 proceeds to step S312, updates a continuous traveling time indicating the time during which the driver has caused the own vehicle to travel by manual driving after turning ON the ignition switch until the current time and then proceeds to step S313. Here, for example, the continuous traveling time is counted by determining whether the same driver performs traveling by manual driving based on the recognition result by the driver recognition apparatus 39. Alternatively, after recognizing the driver once, it is also possible to determine whether the same driver is traveling by manual driving based on an output signal from the seating sensor 38. However, when the driver takes a rest at a service area or the like, even if the driver gets off the vehicle once, if the same driver is seated on the driver seat again within a set time (for example, within one hour), counting of the continuous traveling time may be continued in order to prevent the continuous traveling time from being cleared.

On the other hand, when it is determined in step S311 that the own vehicle is currently stopped, the traveling_ECU 22 jumps to step S313.

After proceeding from step S311 or step S312 to step S313, the traveling_ECU 22 examines whether the continuous traveling time has reached or exceeded the shift permission time.

When it is determined in step S313 that the continuous traveling time has reached or exceeded the shift permission time, the traveling_ECU 22 proceeds to step S314, determines to permit switching to the automatic driving mode based on the evaluation of the driver's experience value with respect to the own vehicle and then exits the subroutine.

On the other hand, when it is determined in step S313 that the continuous traveling time is less than the shift permission time, the traveling_ECU 22 exits the subroutine as is.

In the main routine in FIG. 2, after proceeding from step S101 or step S103 to step S104, the traveling_ECU 22 examines whether both the switching permission determination result based on the skill made in step S102 and the switching permission determination result based on the driving experience value made in step S103 are affirmative determination results.

When it is determined in step S104 that at least one of the switching permission determination result based on the skill or the switching permission determination result based on the driving experience value is a negative determination result, the traveling_ECU 22 exits the routine as is.

On the other hand, when it is determined in step S104 that both the switching permission determination result based on the skill and the switching permission determination result based on the driving experience value are affirmative determination results, the traveling_ECU 22 proceeds to step S105 and examines whether the automatic driving mode is currently in progress.

When it is determined in step S105 that the automatic driving mode is currently in progress, the traveling_ECU 22 exits the routine as is.

On the other hand, when it is determined in step S105 that the automatic driving mode is not currently in progress (that is, when it is determined that the current mode is a manual driving mode, semi-automatic driving mode (first driving assist mode) or evacuation mode), the traveling_ECU 22 proceeds to step S106 and examines whether the traveling environment recognized by the locator unit 11 and the camera unit 21 is established as the traveling environments suitable for the automatic driving mode.

When it is determined in step S106 that the traveling environment is not the traveling environment suitable for the automatic driving mode, the traveling_ECU 22 exits the routine as is.

On the other hand, when it is determined in step S106 that the traveling environment is established as a traveling environment suitable for the automatic driving mode, the traveling_ECU 22 proceeds to step S107 and examines whether the system condition of the automatic driving control apparatus 1 is established.

When it is determined in step S107 that the system condition is not established, the traveling_ECU 22 exits the routine as is.

On the other hand, when it is determined in step S107 that the system condition is established, the traveling_ECU 22 proceeds to step S108 and examines whether the automatic driving mode is selected by the mode switching switch 33.

When it is determined in step S108 that the automatic driving mode is not selected, the traveling_ECU 22 exits the routine as is.

On the other hand when it is determined in step S108 that the automatic driving mode is selected, the traveling_ECU 22 proceeds to step S109, starts the automatic driving mode through mode switching from the current driving mode and then exits the routine.

According to the embodiment described above, the traveling_ECU 22 monitors the driving operation by the driver during traveling in the manual driving mode, evaluates the driver's driving skill, permits the driving mode to be switchable to the automatic driving mode on condition that at least the evaluation value of the driving skill exceeds a threshold set in advance, and can thereby accurately determine whether a driver who gets on the vehicle is suitable to permit traveling in the automatic driving mode.

The traveling_ECU 22 evaluates the driver's driving experience value for the own vehicle based on the driver's traveling history in the manual driving mode, sets a shift permission time until a shift from the manual driving mode to the automatic driving mode is permitted based on the evaluated driving experience value, controls the driving mode so as to be switchable to the automatic driving mode on condition that at least the driving time in the manual driving mode by the driver exceeds the shift permission time, and can thereby accurately determine whether a driver who has got on the vehicle is suitable to permit traveling in the automatic driving mode.

When the driver who has got on the vehicle is not suitable to permit traveling in the automatic driving mode, the driving mode is controlled so that switching to the automatic driving mode is not permitted, and can thereby prevent the driving mode of the own vehicle during traveling on the way to the destination from being switched from the automatic driving mode to the manual driving mode and thereby secure safety.

Note that the locator unit 11, the camera unit 21 and the respective ECUs 22 to 25 constituting the automatic driving control apparatus 1 are each provided with a processor including a central processing unit (CPU) and storage devices such as a ROM and a RAM. All or some of components of a plurality of circuits of the processor may be executed by software. For example, the CPU may read and execute various programs corresponding to the respective functions stored in the ROM.

Furthermore, all or some of the functions of the processor may be carried out by logical circuits or analog circuits, and processing of various programs may be implemented by an electronic circuit such as an FPGA.

The technology is not limited to the above-described embodiment, but various modifications can be made without departing from the gist and scope of the technology in the implementation phase. Furthermore, the above-described embodiment includes various phases of the technology and various technologies can be extracted according to appropriate combinations in a plurality of disclosed constituent elements.

For example, even when some constituent elements are deleted from all the constituent elements illustrated in the embodiment, configurations from which these constituent elements are deleted can be extracted as a technology as long as the described problems can be solved and the described effects can be achieved.

The locator unit 11, the camera unit 21, the traveling_ECU 22, the E/G_ECU 23, the PS_ECU 24 and the BK_ECU 25 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the locator unit 11, the camera unit 21, the traveling_ECU 22, the E/G_ECU 23, the PS_ECU 24 and the BK_ECU 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although an embodiment of the technology has been described in the foregoing by way of example with reference to the accompanying drawings, the technology is by no means limited to the embodiment described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An automatic driving control apparatus for a vehicle that selectively switches a driving mode between a manual driving mode in which a driver manually performs driving operation of the vehicle and an automatic driving mode in which driving operation is performed automatically along a set target traveling route, the automatic driving control apparatus comprising:
a driver identifier configured to identify the driver;
a driving experience value evaluation unit configured to evaluate a driving experience value of the driver for the vehicle on a basis of a traveling history in the manual driving mode of the identified driver;
a shift permission time setting unit configured to set a shift permission time until a shift from the manual driving mode to the automatic driving mode is permitted on a basis of the driving experience value; and
a driving mode switching unit configured to control the driving mode so as to be switchable to the automatic driving mode on condition that at least a driving time by the driver in the manual driving mode exceeds the shift permission time,
wherein the traveling history including a driving date of when the identified driver has driven the vehicle,
wherein the driving experience value evaluation unit evaluates the driving experience value higher as a blank period become short, the blank period being a period from a date when the identified driver drove the vehicle last to a date when the identified driver starts driving the vehicle next, and
wherein the shift permission time setting unit sets the shift permission time to be shorter when the driving experience value is evaluated higher.

2. The automatic driving control apparatus for a vehicle according to claim 1, wherein the driver identifier identifies the driver on a basis of face authentication of the driver seated on a driver seat.

3. The automatic driving control apparatus for a vehicle according to claim 2, wherein the driving experience value evaluation unit evaluates the driving experience value for each the driver on a basis of the traveling history including the driving date, a traveling place, and a traveling distance.

4. The automatic driving control apparatus for a vehicle according to claim 3, wherein the driving experience value evaluation unit evaluates the driving experience value higher as a number of times by which the vehicle traveled to the same traveling place in the past increases or as the traveling distance becomes longer.

5. The automatic driving control apparatus for a vehicle according to claim 2, wherein when the driving experience value is evaluated higher than a predetermined value, the shift permission time setting unit sets the shift permission time to "0".

6. The automatic driving control apparatus for a vehicle according to claim 1, wherein the driving experience value evaluation unit evaluates the driving experience value for each the driver on a basis of the traveling history including the driving date, a traveling place, and a traveling distance.

7. The automatic driving control apparatus for a vehicle according to claim 6, wherein the driving experience value evaluation unit evaluates the driving experience value higher as a number of times by which the vehicle traveled to the same traveling place in the past increases or as the traveling distance becomes longer.

8. The automatic driving control apparatus for a vehicle according to claim 1, wherein when the driving experience value is evaluated higher than a predetermined value, the shift permission time setting unit sets the shift permission time to "0".

9. The automatic driving control apparatus for a vehicle according to claim 1,
wherein the traveling history further includes a traveling distance, and
wherein the driving experience value evaluation unit evaluates the driving experience value higher as a total traveling distance the identified driver has driven the vehicle increases.

10. The automatic driving control apparatus for a vehicle according to claim 9,
wherein the traveling history further includes a traveling place where the driver has driven the vehicle, and
wherein the driving experience value evaluation unit evaluates the driving experience value higher as a number of times the identified driver has passed a same location by the vehicle increases.

11. The automatic driving control apparatus for a vehicle according to claim 1,
wherein the traveling history further includes a traveling place where the driver has driven the vehicle, and
wherein the driving experience value evaluation unit evaluates the driving experience value higher as a number of times the identified driver has passed a same location by the vehicle increases.

12. An automatic driving control apparatus for a vehicle that selectively switches a driving mode between a manual driving mode in which a driver manually performs driving operation of the vehicle and an automatic driving mode in which driving operation is performed automatically along a set target traveling route, the automatic driving control apparatus comprising circuitry configured to:
identify the driver;
evaluate a driving experience value of the driver for the vehicle on basis of a traveling history in the manual driving mode of the identified driver;
set a shift permission time until a shift from the manual driving mode to the automatic driving mode is permitted on a basis of the driving experience value; and
control the driving mode so as to be switchable to the automatic driving mode on condition that at least a driving time by the driver in the manual driving mode exceeds the shift permission time,
wherein the traveling history including a traveling distance, and
wherein the circuitry is configured to evaluate the driving experience value higher as a total traveling distance the identified driver has driven the vehicle increases, and set the shift permission time to be shorter when the driving experience value is evaluated higher.

13. An automatic driving control apparatus for a vehicle that selectively switches a driving mode between a manual driving mode in which a driver manually performs driving operation of the vehicle and an automatic driving mode in which driving operation is performed automatically along a set target traveling route, the automatic driving control apparatus comprising:
- a driver identifier configured to identify the driver;
- a driving experience value evaluation unit configured to evaluate a driving experience value of the driver for the vehicle on a basis of a traveling history in the manual driving mode of the identified driver;
- a shift permission time setting unit configured to set a shift permission time until a shift from the manual driving mode to the automatic driving mode is permitted on a basis of the driving experience value; and
- a driving mode switching unit configured to control the driving mode so as to be switchable to the automatic driving mode on condition that at least a driving time by the driver in the manual driving mode exceeds the shift permission time, wherein the traveling history further includes a traveling place where the driver has driven the vehicle, wherein the driving experience value evaluation unit evaluates the driving experience value higher as a number of times the identified driver has passed a same location by the vehicle increases, and wherein the shift permission time setting unit sets the shift permission time to be shorter when the driving experience value is evaluated higher.

14. The automatic driving control apparatus for a vehicle according to claim 13, wherein the traveling history including a traveling distance, and wherein the driving experience value evaluation unit evaluates the driving experience value higher as a total traveling distance the identified driver has driven the vehicle increases.

\* \* \* \* \*